United States Patent
Nouri et al.

(10) Patent No.: US 12,143,235 B2
(45) Date of Patent: *Nov. 12, 2024

(54) AUTOMATICALLY CONTROLLING PARTICIPANT INDICATION REQUEST FOR A VIRTUAL MEETING

(71) Applicant: Microsoft Technology Licensing, LLC, Redmond, WA (US)

(72) Inventors: Elnaz Nouri, Seattle, WA (US); Ryen White, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,193

(22) Filed: Dec. 12, 2022

(65) Prior Publication Data
US 2023/0110274 A1    Apr. 13, 2023

Related U.S. Application Data

(63) Continuation of application No. 17/191,822, filed on Mar. 4, 2021, now Pat. No. 11,558,212.

(51) Int. Cl.
*H04L 12/18* (2006.01)
*H04L 67/14* (2022.01)
*H04L 67/50* (2022.01)

(52) U.S. Cl.
CPC ...... *H04L 12/1831* (2013.01); *H04L 12/1822* (2013.01); *H04L 67/14* (2013.01); *H04L 67/535* (2022.05)

(58) Field of Classification Search
CPC .............. H04L 12/1831; H04L 67/535; H04L 12/1822; H04L 67/14
USPC ........................................................ 709/204
See application file for complete search history.

(56) References Cited

U.S. PATENT DOCUMENTS

| 2011/0043602 A1* | 2/2011 | Lee ................ H04L 45/586 379/202.01 |
| 2019/0020853 A1* | 1/2019 | Segal .................. H04N 7/15 |
| 2022/0131979 A1* | 4/2022 | Pham ................. G10L 17/22 |

* cited by examiner

*Primary Examiner* — James E Springer

(57) ABSTRACT

Systems and methods are provided for automatically controlling a participant indication request based on a context of a meeting. The controlling of the participant indication request includes automatic lowering of a raised hand. A context determiner determines the context of the meeting based on meeting data including video, audio, background acoustic data, and chat messaging. The context determiner uses a global participant indication model for determining a context that is in commonly used among participants of the meeting. An individual participant indication model captures participant-specific rules of determining a context. A meeting state manager determines a meeting state based on the context. The meeting state includes a host presentation, a participant presentation, a conversation, and a polling. A participant indication controller automatically lowers the raised hand based on a combination of the determined context and the meeting state.

20 Claims, 11 Drawing Sheets

AUTOMATICALLY CONTROLLING PARTICIPANT INDICATION REQUEST FOR A VIRTUAL MEETING

CROSS-REFERENCE TO RELATED APPLICATIONS

This application is a continuation of U.S. patent application Ser. No. 17/191,822, filed on Mar. 4, 2021, the disclosure of which is hereby incorporated by reference in its entirety.

BACKGROUND

Virtual meeting systems have become more popular as more meetings take place among remote locations due to economic and societal factors. Virtual meetings generally include transmitting video and audio content through various networks including the Internet. Some traditional virtual meeting system provides features for participants to communicate among each other in addition to the main video or audio communications. For example, participants exchange text messages over a chat feature and sent an alert for seeking a focus of attention from other participants by raising a hand. Participants of the virtual meeting expect these additional features to keep being synchronous to progression of the virtual meeting through video and audio for the participants of the video meeting to use the features effectively. Thus, developing a technology that serves the needs of improving interactions among participants during the virtual meeting would be desirable.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by automatically updating participant indication requests of individual participants during a virtual meeting based on a context and a status of the virtual meeting. In aspects, a "virtual meeting" refers to a session of a teleconference among participants over a network. The teleconference may use video, audio, or both.

The present disclosure relates to automatically controlling a participant indication request by a participant during a virtual meeting. The disclosed technology uses meeting states and conversational models to determine context of individual participants of a virtual meeting based on meeting data. The meeting data includes video, audio, and acoustic data. The disclosed technology uses the determined context in turn to determine a meeting state. In aspects, meeting states describes various states of the virtual meeting. The meeting states include, but are not limited to, a one-way presentation, a conversation, polling, etc. The conversational models include a global model for modeling contexts of participating the virtual meeting, which are common among all participants of the virtual meeting. Additionally, or alternatively, the conversational model includes individual models, for individual participants of the virtual meeting.

A context determiner determines a context of a virtual meeting and contexts of individual participants of the virtual meeting. The context determiner identifies individuals in received meeting data (e.g., video, audio, and acoustic data) and further determines contexts of the individuals in the virtual meeting by determining various cues made by the individuals based on facial expressions, gestures, and utterances.

A meeting state manager determines and updates a state of the virtual meeting based on the determined context. For example, a state may be host presentation when a host of the virtual meeting provides a presentation to participants in mainly a one-way communication. Participants may raise hands during the host presentation to request for a focus of attention from the host and give a floor for the participant to ask a question. An example state may be polling when the host takes a poll of responses by raising hands by participants of the virtual meeting. Participants may raise hands to vote for one or more of options available.

A participant indication controller controls a state of a participant indication request of respective participants of the virtual meeting. For example, the participant indication controller may control the participant indication request by raising or lowering the hand of select participants of the virtual meeting. In aspects, the raised hand may be displayed as a graphical indicator and/or an icon (e.g., a hand) in graphical user interface associated with the participant in the graphical user interfaces of the host and other participants of the virtual meeting.

In aspects, a term "participant indication request" refers to a request made by one of participants of the virtual meeting to bring attention or a focus by at least the host of the meeting. For example, a raise hand feature is a type of a participant indication request in a virtual meeting application system. A participant may raise hand when the participant has a question to the host or needs some focus from the host. Additionally or alternatively, the participant may raise hand when the host takes a poll on some subject matter by responding to select one or more options.

Issues may arise when a participant forgets or neglects lowering the raised hand, even after the participant has already spoken or asked a question. A hand that has been raised and unintentionally kept raised may cause unnecessary focus by the host, which interrupts the virtual meeting. There may also be a case where the hand may have been kept raised because the participant wants to keep asking questions.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Figure 1:
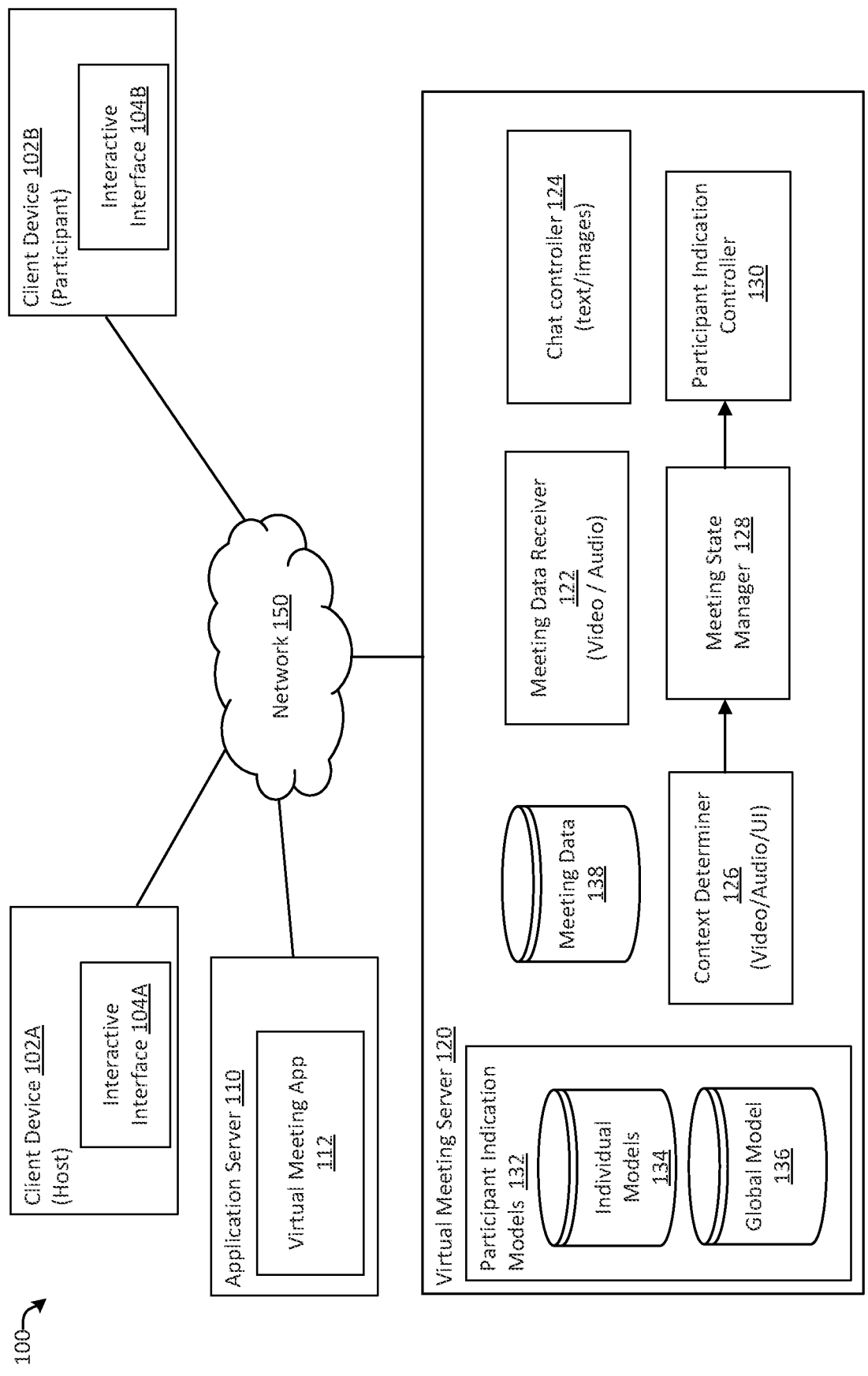
FIG. 1 illustrates an overview of an example system for automatically controlling participant indication requests in accordance to aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present application relates to systems and methods for automatically controlling participant indication requests in a virtual meeting. A participant indication controller may raise or lower participant indication requests in response to detecting visual and acoustic data from hosts and participants of the virtual meeting. In particular, a context determiner may determine context of an ongoing virtual meeting based on data associated with the virtual meeting. The data may include video, audio speech, acoustic data, and chat texts and images among participants of the virtual meeting.

The context determiner uses global participant indication models and individual participant indication models. A participant indication model represents a model that describes individual or group of individuals in a meeting, either as a global, common, or individualized model. For example, a global participant indication model may indicate that a video scene of a participant of the meeting looking away toward a direction that is more than a predefined angle from the camera, the microphone is mute, and talking with someone more than a predefined time period. The model may define that the video scene translates into a context where the participant is at least not presenting. The model may also predict a participant indication request that indicates lowering a hand associated with the participant. In some aspects, the model predicts the meeting context with one or more levels of confidence based on one or more attributes of the virtual meeting. In some other aspects, the participant indication model is trainable using at least the meeting data for respective participants of the virtual meeting. Additionally, or alternatively, the participant indication model may be trained using meeting data from prior meetings. In aspects, the prior meetings may include prior virtual meetings with conversations associated with the participant.

As discussed in more detail below, the present disclosure relates to a system and a method for automatically controlling participant indication requests in a virtual meeting. The participant indication requests may include a raising hand feature of the system. For example, a participant of a virtual meeting may want to bring a focus of attention from the host of the virtual meeting for asking a question. The participant may place a participant indication request by activating the raise hand feature. Activating the participant indication request (e.g., raising a hand) may cause the system to display a graphical representation (e.g., an icon) of a hand that represents the participant at least on the meeting host's screen. This way, the host would notice the raised hand and permit the participant to ask a question. In some aspects, the system provides a method for the participant or the host, who manually lowers the hand of the participant once the host permits the participant to take floor of the virtual meeting and speak.

The present technology addresses the problem of a participant neglecting to deactivate the participant indication request (e.g., lowering the raised hand) even after the participant had an opportunity to bring the focus of attention from the host and to ask a question or when the participant is no longer interested in the focus of attention (e.g., the topic of the conversation changes), for example.

FIG. 1 illustrates an overview of an example system 100 for automatically controlling participant indication requests in accordance with aspects of the present disclosure. System 100 represents a system for a virtual meeting among one or more hosts and participants over a network at remote locations. System 100 includes client devices 102A-B, an application server 110, and a virtual meeting server 120. The client devices 102A-B communicates with the application server 110, which includes one or more sets of instructions to execute as applications on the client devices 102A-B. The client device 102A includes an interactive interface 104A. The client device 102A may be for use by a host of a virtual meeting. The client device 102B includes an interactive interface 104B. The client device 102B may be for use by a participant of the virtual meeting. The virtual meeting server 120 includes a meeting data receiver 122 (video/audio), a chat controller 124 (text/images), a context determiner 126 (video/audio/UI), a meeting state manager 128, a participant indication controller 130, and participant indication models 132. The participant indication models 132 include individual participant indication models 134, and a global participant indication model 136.

The client device 102A (Host) connects with the application server 110 via the network 150 to execute applications that include user interactions through the interactive interface 104A. The interactive interface 104A in the client device 102A (Host) includes an interactive virtual meeting application and/or an interactive browser for clients to interactively participate in virtual meetings. The client device 102B (Participant) connects with the application server 110 via the network 150 to execute applications that include user interactions through the interactive interface 104B. The interactive interface 104B in the client device 102B (Participant) includes an interactive virtual meeting application and/or an interactive browser for clients to interactively participate in virtual meetings. The application server 110 interacts with the client device 102A (Host), the client device 102B (Participant), and the virtual meeting server 120 via the network 150 to perform virtual meeting application services. In aspects, a virtual meeting includes a teleconference among users of the system using video and/or audio data feed among client devices at remote locations. In some aspects, the virtual meeting may include additional features including a chat feature. The chat feature enables participants of the virtual meeting to exchange texts and images, either directly between specific users or to the floor of the meeting. The chat may take place concurrently while the video/audio meeting is held.

The client device 102A (Host) and the client device 102B (Participant) are computer devices. The computer devices provide user-input capabilities e.g., via interactive interface 104A and interactive interface 104B, respectively. The computer devices collectively perform a virtual meeting over the network 150. In some aspects, a host of the virtual meeting uses the client device 102A (Host). A participant of the virtual meeting uses the client device 102B (Participant). In aspects, a "host" organizes and facilitates a virtual meeting. For example, a "participant" may join the virtual meeting in response to an invitation for the virtual meeting.

The application server 110 is a server that enables a user (e.g., a host and a participant) to interactively use the system 100 on the client device 102A (Host) and the client device 102B (Participant) respectively. The application server 110 may comprise applications including the virtual meeting app 112. The virtual meeting app 112 may provide a rendering of various features of virtual meetings for viewing and for interactions by the user.

In aspects, the virtual meeting app 112 may connect with the virtual meeting server 120 perform virtual meeting services. The virtual meeting server 120 operates as a server of the virtual meeting application service. In aspects, the virtual meeting app 112 communicates with the meeting data receiver 122 of the virtual meeting server 120 over the network 150. The virtual meeting app 112 may further communicate with the chat controller 124 of the virtual meeting server 120 to transmit and receive text and image data for chat messaging during the virtual meeting among the users. In aspects, there may be more than one host and more than one participants for a virtual meeting.

The virtual meeting server 120 performs virtual meetings by controlling respective virtual meetings, receiving and sending video and audio data to the client device 102A (Host) and the client device 102B (Participants) respectively over the network 150. The virtual meeting server 120 further provides a variety of additionally features for virtual meeting. For example, the virtual meeting server 120 may receive and transmit text and image data as a part of chat messaging features during the virtual meeting.

The meeting data receiver 122 (video/audio) receives meeting data from the client device 102A (Host) and the client device 102B (Participants) during a virtual meeting. The meeting data may include video streams and audio utterance data of the hosts and the participants and audio utterance. In aspects, the meeting data receiver 122 (video/audio) may also receive acoustic data for background sounds. In some aspects, the meeting data receiver 122 (video/audio) may receive data for screen sharing among the hosts and the participants.

The chat controller 124 (text/images) controls chat messaging feature of the virtual meeting application. The chat messages enable hosts and participants of a virtual meeting to exchange text and image data as chat messages during the virtual meeting. The chat messages may either be directly between specific hosts and participants (including between hosts, between participants). The chat messaging may take place while the hosts and the participants hold video and/or audio real time teleconference.

The context determiner 126 determines a context of individual hosts and participants of the virtual meeting. In an example, the context determiner 126 uses participant indication models 132 to the received meeting data to determine the context. In aspects, the context determiner 126 uses the individual participant indication models 134 that is specific to a particular host or participant to determine a context. For example, one of the individual participant indication models 134 corresponds to a participant who routinely reactivates a participant indication request (e.g., a raised hand) within a predetermined time period after the system automatically deactivate the participant indication request. The participant manually deactivates the participant indication request after finishing speaking and the host starts to speak. Accordingly, the model for the participant may have learnt based on a usage pattern to prevent the participant indication control from being automatically deactivated until the host starts speaking immediately after the participant stops talking. In some aspects, the context determiner 126 includes natural language recognition to recognize words spoken by hosts and participants.

In some other aspects, the global participant indication model 136 includes models that are common among all the hosts and the participants of virtual meetings. For example, there may be a common model to deactivate participant indication requests of all the participants of a virtual meeting when the received meeting data includes an utterance by the host to change a topic of presentation or discussion after using the polling feature of the virtual meeting.

In some aspects, an output of the participant indication model includes a value of a confidence level of the prediction. In aspects, the value of the confidence level of the prediction may be associated with a probability distribution of alternatives of the prediction. For example, the value of the confidence level for the prediction is higher when a likelihood of the prediction is higher.

The meeting state manager 128 determines a meeting state based on the determined context for respective hosts and participants of the virtual meeting. In aspects, a meeting state may include a host presentation state, a participant presentation state, a conversation state, and a polling state. For example, when the determined context of the users of a virtual meeting indicates the host speaking for more than a predetermined time, the meeting state manager 128 may determine the host presentation state as a meeting state. Similarly, when the determined context of the users of the virtual meeting indicates a participant speaking for more than the predetermined time, the meeting state manager 128 may determine the participant presentation state as a meeting state. The meeting state manager 128 may determine polling as the meeting state when the determined context indicates the host mentions taking a poll.

The participant indication controller 130 automatically controls participant indication requests for hosts and participants of a virtual meeting. In aspects, a participant indication request may refer to a notice seeking for a focus of attention by the hosts and participants of the virtual meeting. For example, a raise hand feature may represent a participant indication feature of some virtual meeting applications. In aspects, the participant indication controller 130 updates a status of a participant indication request (e.g., raising or lowering a hand) for a particular user based on a determined context for the particular user. In some other aspects, the participant indication controller 130 may update a participant indication request for a particular user, in response to a change in a meeting state. For example, the participant indication controller 130 may deactivate active participant indication requests of users of the virtual meeting when the meeting state changes from a polling state to another state. The polling state uses participant indication request as means for the users to express respective options for a poll.

In aspects, the participant indication controller 130 may transmit an alert to the participant when a confidence level of the prediction based on an output of the participant indication model is less than a predefined threshold. The alert may include a message that solicit the participant to lower the hand when the participant is no longer interested in raising the hand to gain focus of the virtual meeting. The participant indication controller 130 may automatically deactivate the participant indication request and lower the hand when the confidence level is higher than the threshold.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
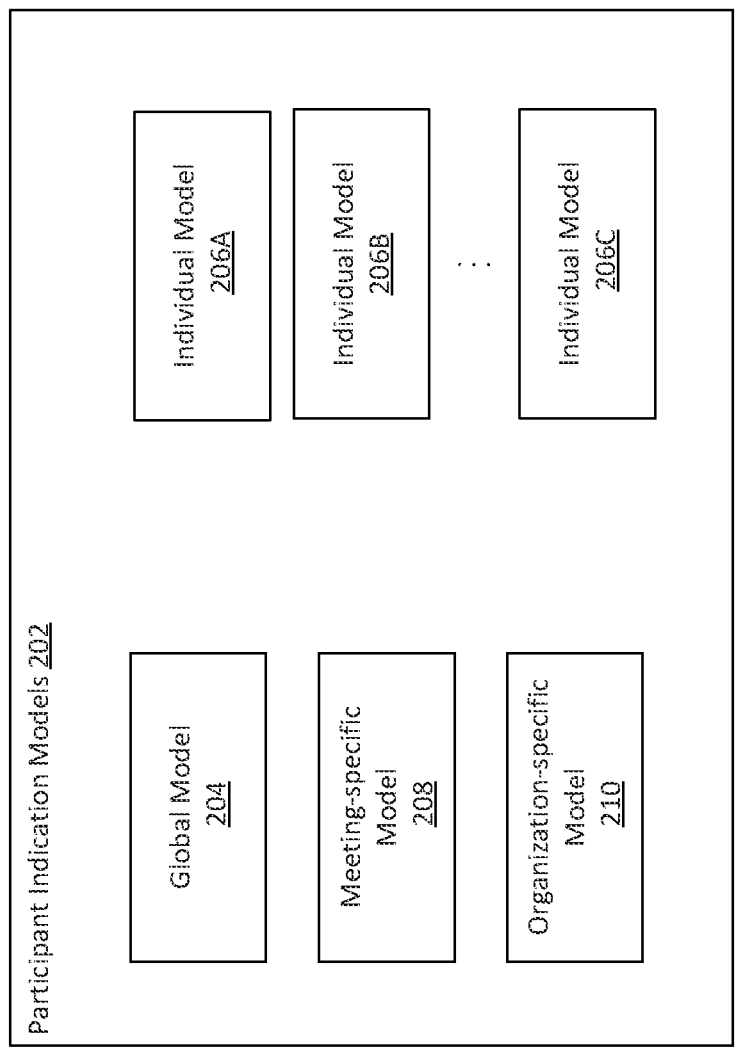
FIG. 2 illustrates an example of participant indication models in accordance with aspects of the present disclosure.

FIG. 2 illustrates an example of the participant indication models according to aspects of the present disclosure. The example 200 includes participant indication models 202. The participant indication models 202 include a global participant indication model 204 and a set of individual participant indication models 206A-C. In aspects, the global participant indication model 204 enables determining a context that is common across the users of a virtual meeting. For example, the global participant indication model includes a scenario where a speaker in a virtual meeting changes a topic of an utterance from one topic to another. The output from the global participant indication model for the scenario may be to deactivate participant indication requests of all participants of the virtual meeting because of the change in the subject matter.

A meeting-specific participant indication model 208 enables determining a context that is specific to one or more virtual meetings. For example, the meeting-specific participant indication model 208 may be specific to a series of weekly staff meetings of a particular group of people. An organization-specific participant indication model 210 enables determining a context that is specific to at least an organizational group. For example, the organization-specific participant indication model 210 may be specific to virtual meetings held by a product-marketing group of an organization.

In some aspects, the individual participant indication models 134 include models that are specific to a host or a participant. The individual participant indication models 134, for example, may capture some habits of respective users who tend to forget lowering a hand and manually lowering the hand while someone else talks for a predefined time. The individual participant indication models 134 under the scenario specify deactivating the participant indication request for the host or the participant when the host or the participant ends talking and then someone else starts talking.

Figure 3:
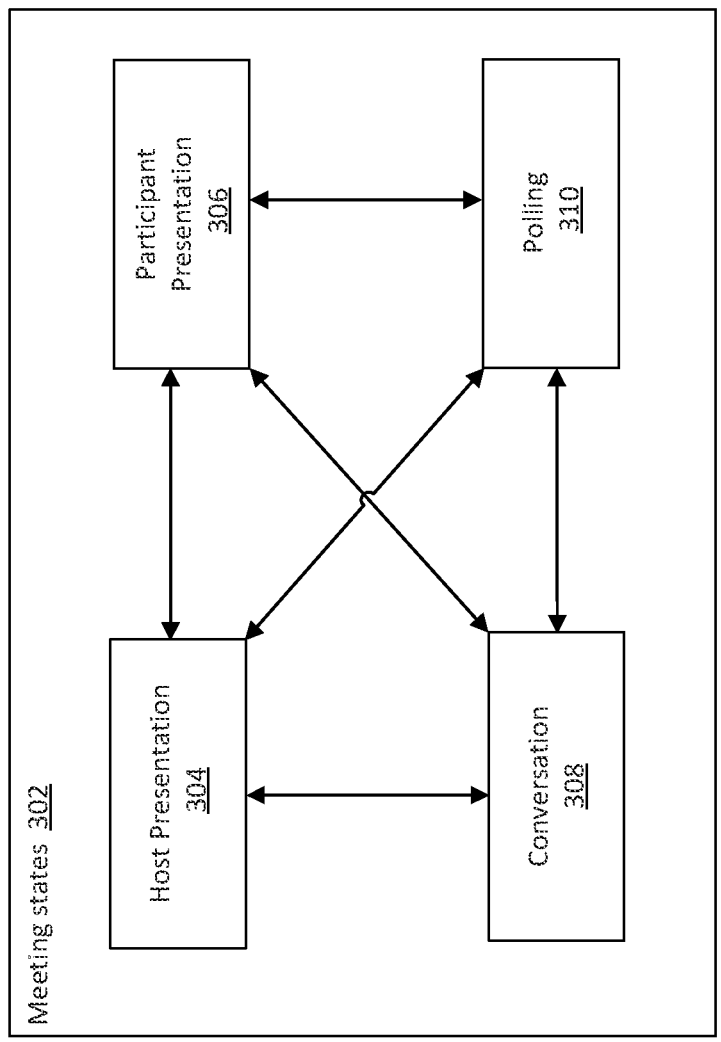
FIG. 3 illustrates an example of meeting states in accordance with aspects of the present disclosure.

FIG. 3 illustrates an example of meeting states according to aspects of the present disclosure. The example 300 illustrates a set of meeting states 302. The set of meeting states 302 may include, but not limited to, a host presentation 304, a participant presentation 306, a conversation 308, and a polling 310. Each of the meeting states 302 represent distinct states of a virtual meeting. For example, a host presentation 304 corresponds to a state of the virtual meeting where the host speaks and provides a presentation while others listen to the host. The host presentation 304 state may accommodate participants activating respective participant indication request (e.g., raising a hand) and asking questions. Similarly, the participant presentation 306 state represents a situation where a participant of a virtual meeting provides a presentation and/or speaks dominantly for more than a predetermined time. During the participant presentation 306, the hosts and other participants may activate participant indication requests to solicit a focus of attention from the host and the speaking participant to ask questions.

Conversation 308 state represents a situation where more than one users are interactively speaking without any one of them dominating. For example, a Q&A session and free discussions during a virtual meeting may correspond to the conversation 308 state. In aspects, the conversation 308 state may accommodate participants activating participant indication requests when respective participants wishes to bring the host's focus of attention and give the floor to the participants for asking questions. In some other aspects, the conversation 308 state may be highly interactive with participants talking for a less than a predetermined utterance duration at a time. Accordingly, in some aspects, the conversation 308 state may disable all the participant indication requests and encourage the participants to speak up or hand-wave over the video screen.

The polling state 310 represent a situation where the host is conducting a polling from the hosts and the participants of a virtual meeting. In aspects, the virtual meeting server may receive an utterance speech made by the host to request participants to cast a vote to one or more options or answers to a given question. Accordingly, the participants may activate participant indication requests (e.g., raise a hand) to cast a vote in response to the question from the host. The host may count a number of votes to determine a result of the polling.

In aspects, the meeting state manager (e.g., the meeting state manager 128 in FIG. 1) may determine and update a meeting state of a virtual meeting when the state changes from one to another. The participant indication controller 130 may deactivate active participant indication requests of one or more participants of the virtual meeting when the state changes. For example, the participant indication controller 130 may automatically deactivate participant indication requests of all participants of a virtual meeting when the meeting state changes between the polling 310 state and any other state. A purpose of using the participant indication request during polling is to cast votes, which is distinct from soliciting a focus of attention from the host to ask questions in any other meeting state. In some other aspects, the participant indication controller 130 may deactivate active participant indication requests of the host of a virtual meeting when the meeting state changes from the conversation 308 mode to the host presentation 304 state. The host has a control of the floor when the meeting state is the host presentation 304.

Figure 4A:
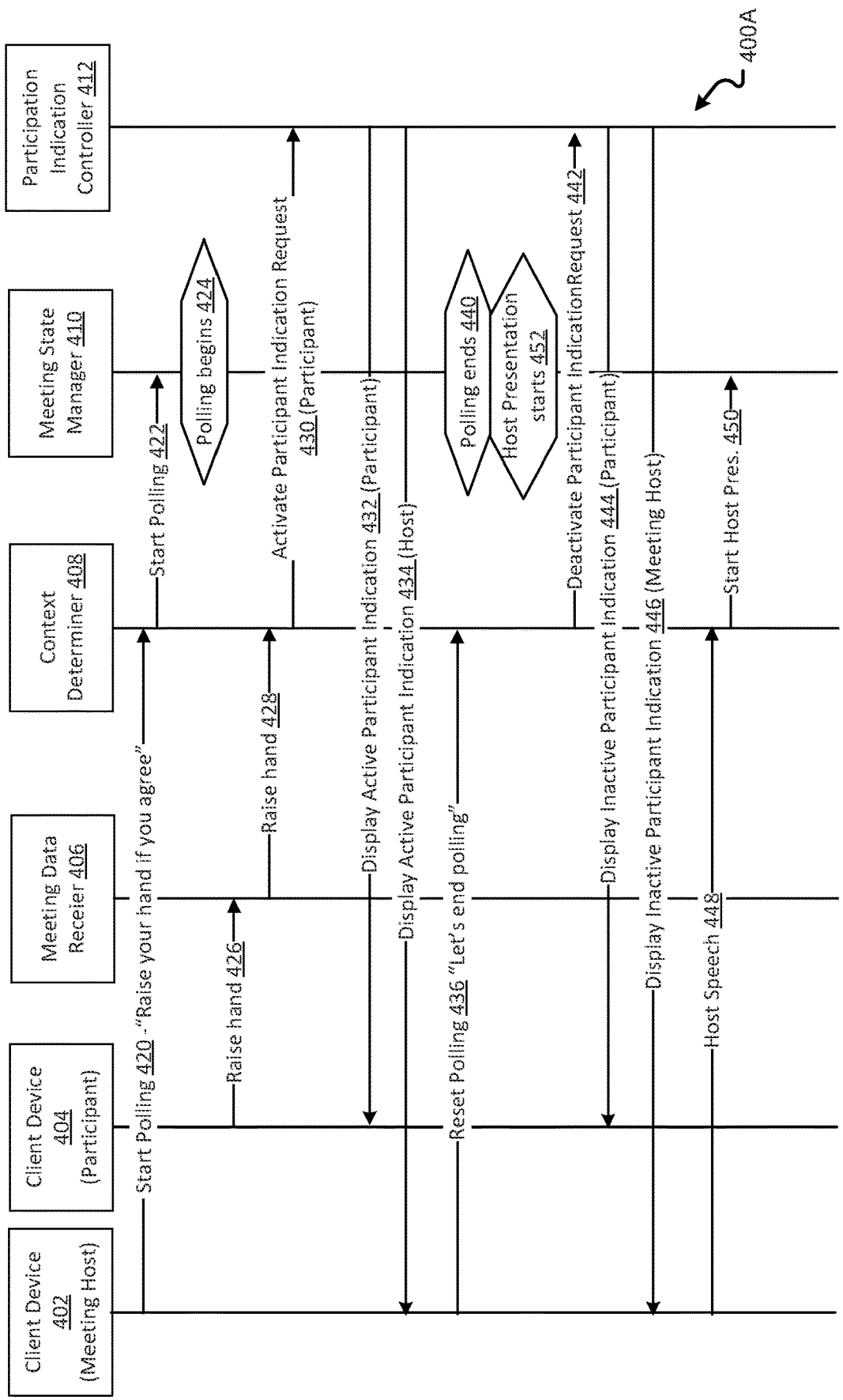
FIG. 4A illustrates an example of processing automatic controls of participant indication requests in accordance with aspects of the present disclosure.
Figure 4B:
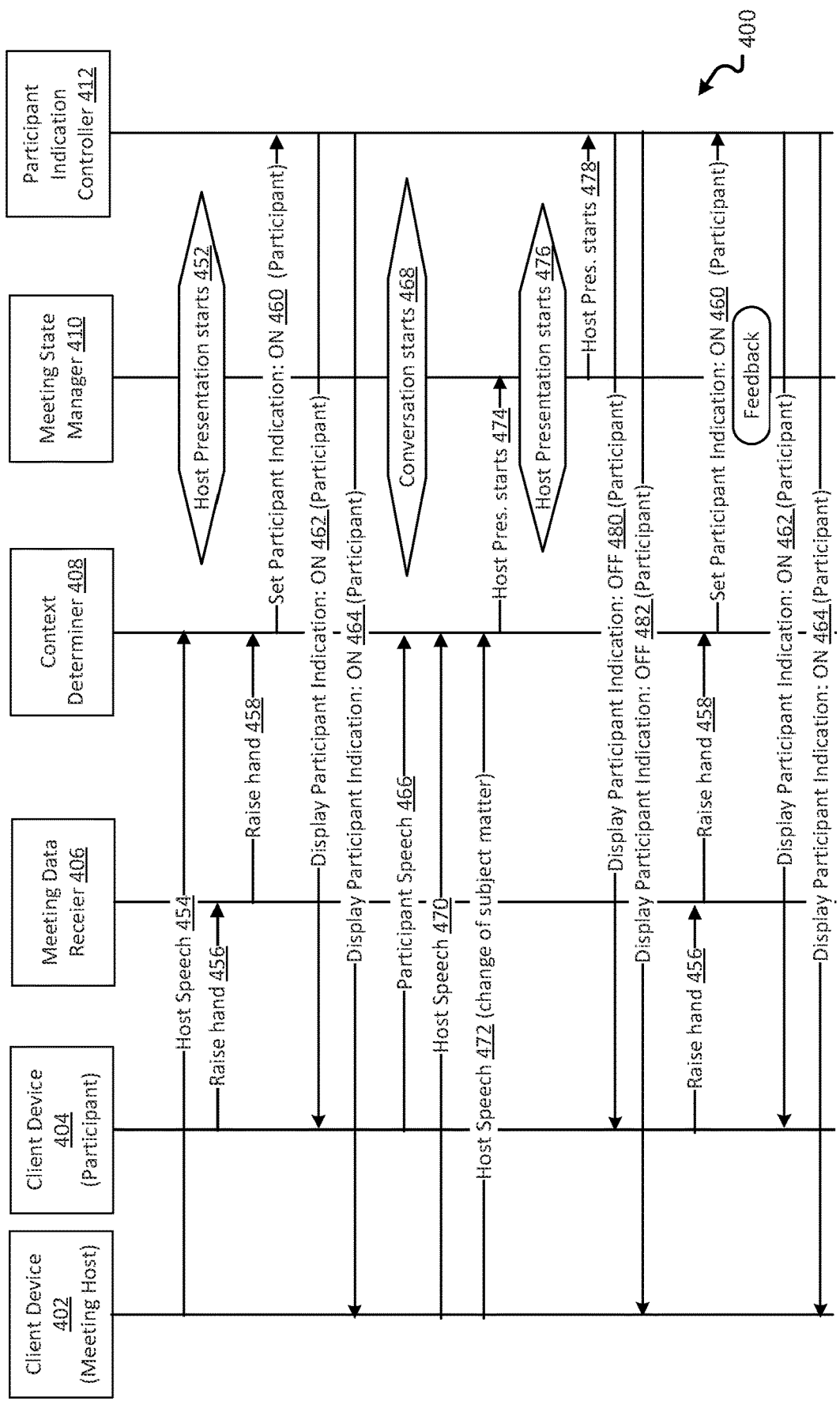
FIG. 4B illustrates an example of processing automatic controls of participant indication requests in accordance with aspects of the present disclosure.

FIG. 4A illustrates an example of automatically controlling participant indication requests during a virtual meeting according to aspects of the present disclosure. The example 400A illustrates a sequence of operations in the virtual meeting system. The client device 402 (Meeting Host)

transmits a speech utterance 420 by the host of the virtual meeting to solicit vote for polling by initiating playback of the statement "Raise your hand if you agree." The context determiner 408 determines taking a poll as a context based on the natural language utterance by the host. The meeting state manager 410 sets polling as a meeting state. The polling starts 424. Hearing the host requesting to cast a vote, the client device 404 (Participant) interactively activates a participant indication request (e.g., raising a hand) through graphical user interface. The meeting data receiver 406 receives the change in user interface selections. The meeting data receiver 406 then sends a "raise hand" 428 as a received user interactive command to the context determiner 408. The context determiner 408 accordingly determines, in conjunction of use of the participant indication models, that the context is to activate a participant indication request for the participant. Accordingly, the context determiner 408 transmits a command 430 to activate a participant indication request for the participant. The participant indication controller 412 in turn transmits a command 432 to display the active participant indication (e.g., a raised hand) in the client device 404 (Participant) and another command 434 to display the active participant indication in the client device 402 (Meeting Host).

After the polling ends, the meeting host using the client device 402 (Meeting Host) may make utterance 436 "Let's end polling." Based on the utterance, the Context determiner 408 may determine that the context of the meeting is to end the polling. Based on the determined context of ending the polling, the meeting state manager 410 may end the polling 440 and start a host presentation 452 as a new meeting state. Accordingly, the context determiner 408 transmits a command for deactivating participant indication request 442 to the participant indication controller 412. The participant indication controller 412 then send a command to the client device 404 (Participant) to display inactive participant indication (e.g., a lowered hand) 444 and another command to the client device 402 (Meeting Host) to display inactive participant indication (e.g., a lowered hand) 446. Subsequently, the host starts speaking and the client device 402 (Meeting Host) sends the host utterance 448 to the context determiner 408. The context determiner 408, based on the utterance and the participant indication models, determines that a new context is the host presenting. The meeting state manager 410 updates 450 the meeting state to the host presentation based on the determined context.

Figure 5:
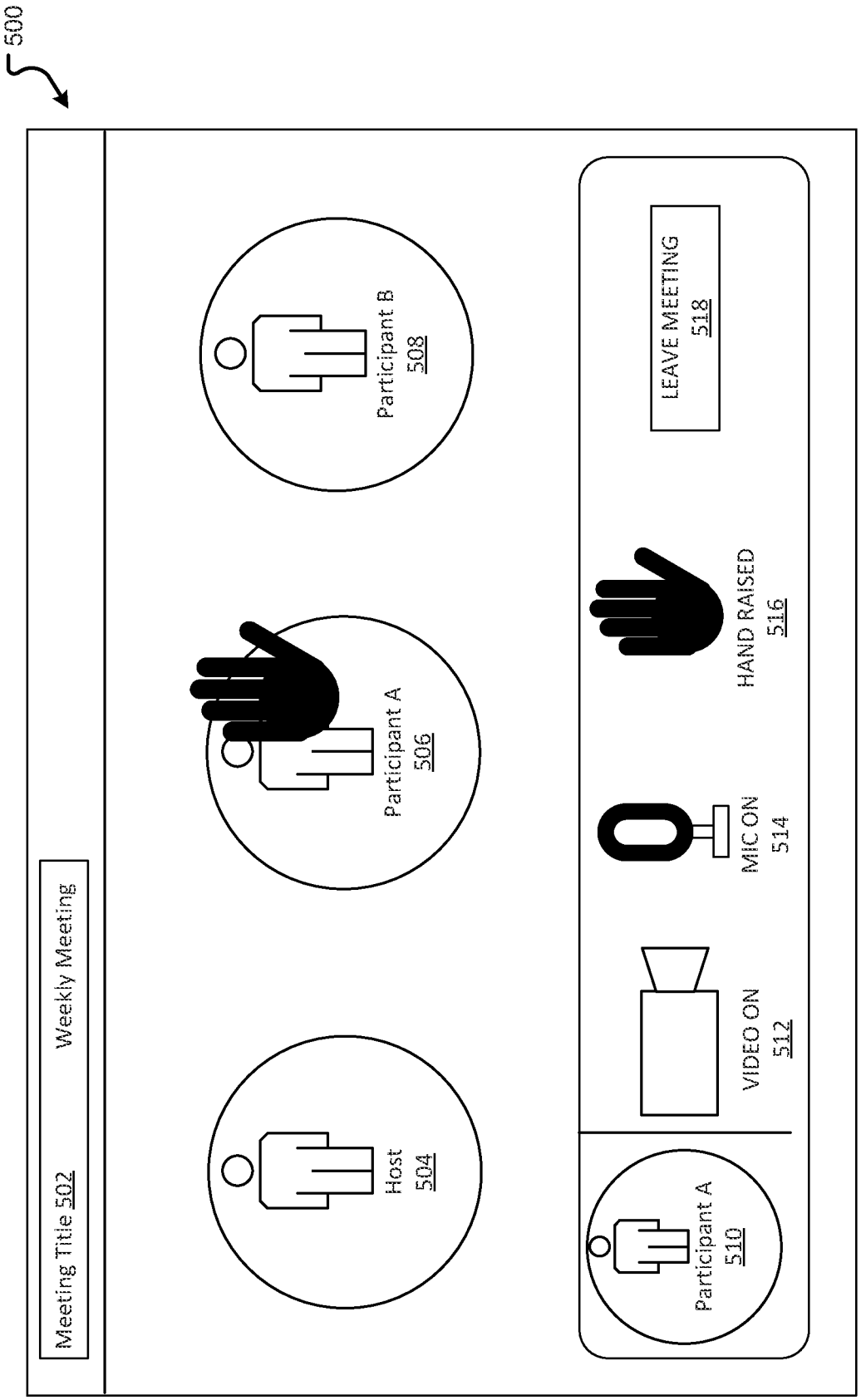
FIG. 5 illustrates an example of interactive user interface of a virtual meeting application in accordance with aspects of the present disclosure.

FIG. 5 illustrates an example user interface of a virtual meeting application on the client device according to the present disclosure. In particular, the example 500 illustrates an example of a virtual meeting, which is taking place among the host 504, participant A 506 and participant B 508. The meeting title 502 is "Weekly Meeting." The example 500 is an application screen for the participant A 510 as indicated in the bottom left corner. The example 500 shows three icons for respective users in the virtual meeting: the host 504, the participant A 506, and the participant B 508. The icon for the participant A 506 includes a graphical indicator of a hand icon, which represents a participant's interest to be the focus of the virtual meeting. In aspects, a display status of the graphical indication is based on a participant indication request made by the participant A.

The example 500 indicates icons for controlling settings of the participant A joining the call. In the example, A's Video is turned ON 512 and A's microphone is ON 514. The icon to change a participant indication request, a hand icon 516 (hand raised), for example, indicates that the activation request is active (e.g., the hand raised). In aspects, the active status of the participation indication request may be graphically displayed by the hand icon 516 and an indication of the hand in the vicinity area of a graphical representation of Participant A 506. The leave meeting 518 button ends the meeting if selected by the user.

Figure 6A:
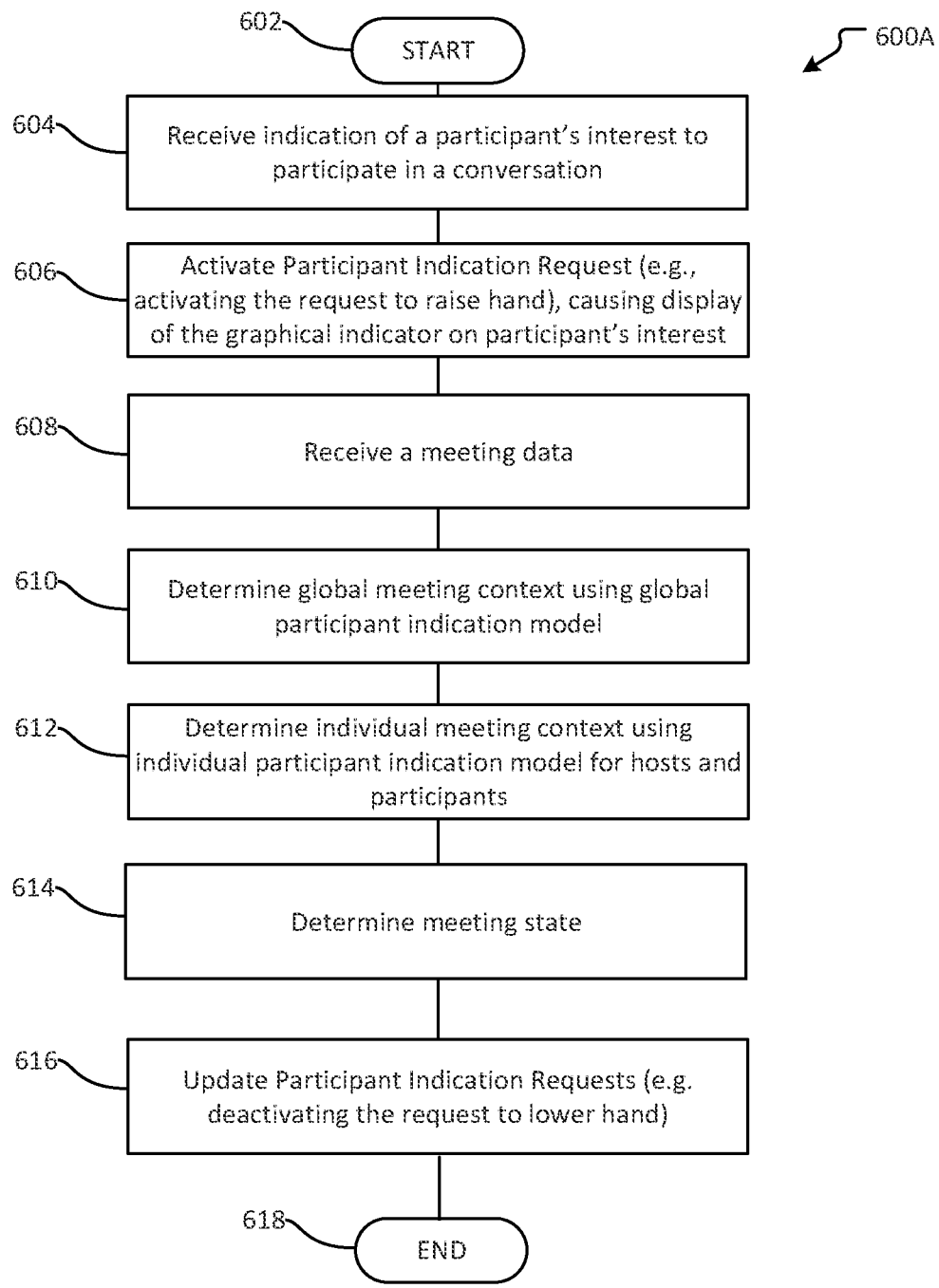
FIG. 6A illustrates an example of a method for automatically controlling participant indication requests in accordance with aspects of the present disclosure.

FIG. 6A is an example of a method for automatically controlling participant indication requests in accordance with aspects of the present disclosure. A general order of the operations for the method 600A is shown in FIG. 6A. Generally, the method 600A begins with start operation 602 and ends with end operation 618. The method 600A may include more or fewer steps or may arrange the order of the steps differently than those shown in FIG. 6A. The method 600A may be executed as a set of computer-executable instructions executed by a computer system and encoded or stored on a computer readable medium. Further, the method 600A can be performed by gates or circuits associated with a processor, an ASIC, an FPGA, a SOC or other hardware device. Hereinafter, the method 600A shall be explained with reference to the systems, components, devices, modules, software, data structures, data characteristic representations, signaling diagrams, methods, etc., described in conjunction with FIGS. 1, 2, 3, 4, 5, 6B, 7, and 8A-B.

Following start operation 602, the method 600 begins with receive operation 604, which receives meeting data of a virtual meeting from the client devices. The meeting data may include video data, audio data, and background acoustic data. For example, the meeting data may include utterance made by the host as audio data. In aspects, the receive operation 604 may receive indication of a participant of the virtual meeting a participant interest. The participant interest includes participating in a conversation in the virtual meeting. For example, the indication may be in one or more forms including video data, audio data, a timer (e.g., remaining time of a virtual meeting), chat texts or image data.

Activate operation 606 activates a participant indication request for a participant of a virtual meeting. In aspects, the activate operation 606 may be in response to the participant interactively selecting one of icons (e.g., the hand icon 516 in FIG. 5) in a virtual meeting application to activate a participant indication request (e.g., raising a hand). Additionally, or alternatively, the activate operation 606 may include update operation that updates the participant indication request from a previous state of the participant indication request.

Receive operation 608 receives a subsequent meeting data associated with the virtual meeting from the client devices. The subsequent meeting data may be subsequent to the meeting data that has previously received to update the participant indication request in the activate operation 606. The meeting data may include video data, audio data, and background acoustic data. For example, the meeting data may include utterance made by the host as audio data. In aspects, the receive operation 608 may receive video data, audio data, a timer (e.g., remaining time of a virtual meeting), chat texts or image data.

Determine operation 610 determines a global meeting context using a global participant indication model. In aspects, the global participant indication model includes conditions for determining contexts that may be in common among hosts and participants of a virtual meeting. For example, the determine operation 610 may determine that a topic of a presentation has ended and no more time left in the allocated time of the virtual meeting. In aspects, the combination of the end of a topic and not more time left may correspond to automatically deactivating active participant indication request for at least one participant for the virtual meeting. In some other aspects, the determine operation 610 analyzes received video cues and signals. The determine operation 610 determines that a particular participant appears to be distracted, looking away, and not reacting to the host and other participants. The determine operation 608 further determines that the participant indication request for this particular participant is active. Accordingly, the determine operation 610 determines the context to be the participant not engaged in the meeting and thus it is appropriate to deactivate the participant indication request for the participant.

Determine operation 612 determines individual meeting contexts for respective hosts and participants of a virtual meeting. In particular, the determine operation 612 may use a combination of the global participant indication model and the individual participant indication model for a particular host or a participant. In aspects, the individual participant indication models are specific to individuals. For example, an individual participant indication model for a participant may be trained based on the fact that the participant typically manually activate a participant indication request as soon as the system automatically deactivates the participant indication request after a polling completes. Accordingly, the determine operation 612 may determine to keep the active participant indication request even if the system deactivates active participant indication requests for the rest of participants of the virtual meeting. In some aspects, the determine operation 612 may including aggregating the global meeting context and the individual meeting context by varying weights among the contexts and generating an aggregated meeting context. In some aspects, the weights may be based on attributes including attributes and topics of the virtual meeting and participants.

Determine operation 614 determines a meeting state of the virtual meeting. In particular, the determine operation 614 may use the determined meeting context to determine the meeting state. For example, the meeting state may one of: the host presentation, the participant presentation, the conversation, and the polling. The host presentation represents the host making a presentation to participants of the virtual meeting, primarily one way from the host. The participants may ask questions to the host by activating the participant indication request (e.g., raising a hand). The participant presentation represents one of the participants making a presentation to others in the virtual meeting. The virtual meeting permits asking questions by activating the participant indication request. The conversation state represents a free two-way or multi-way conversation among participants of the virtual meeting. Spontaneous utterance may be prevalent without formal queues for speaking. For example, the poll state represents the host taking a poll of a specific topic using the raise hand feature of the virtual meeting. In some aspects, the determine operation 614 may determine the meeting state based on the aggregated meeting context.

Update operation 616 automatically updates a participant indication request based on the determined meeting context and/or the meeting state. In particular, the update operation 616 may activate or deactivate participant indication requests (e.g., raising or lowering hand). The update operation 616 causes the respective client devices that are associated with the virtual meeting to display the participant indication requests in an updated state. The end operation 618 ends the method 600A.

As should be appreciated, operations 602-618 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6B:
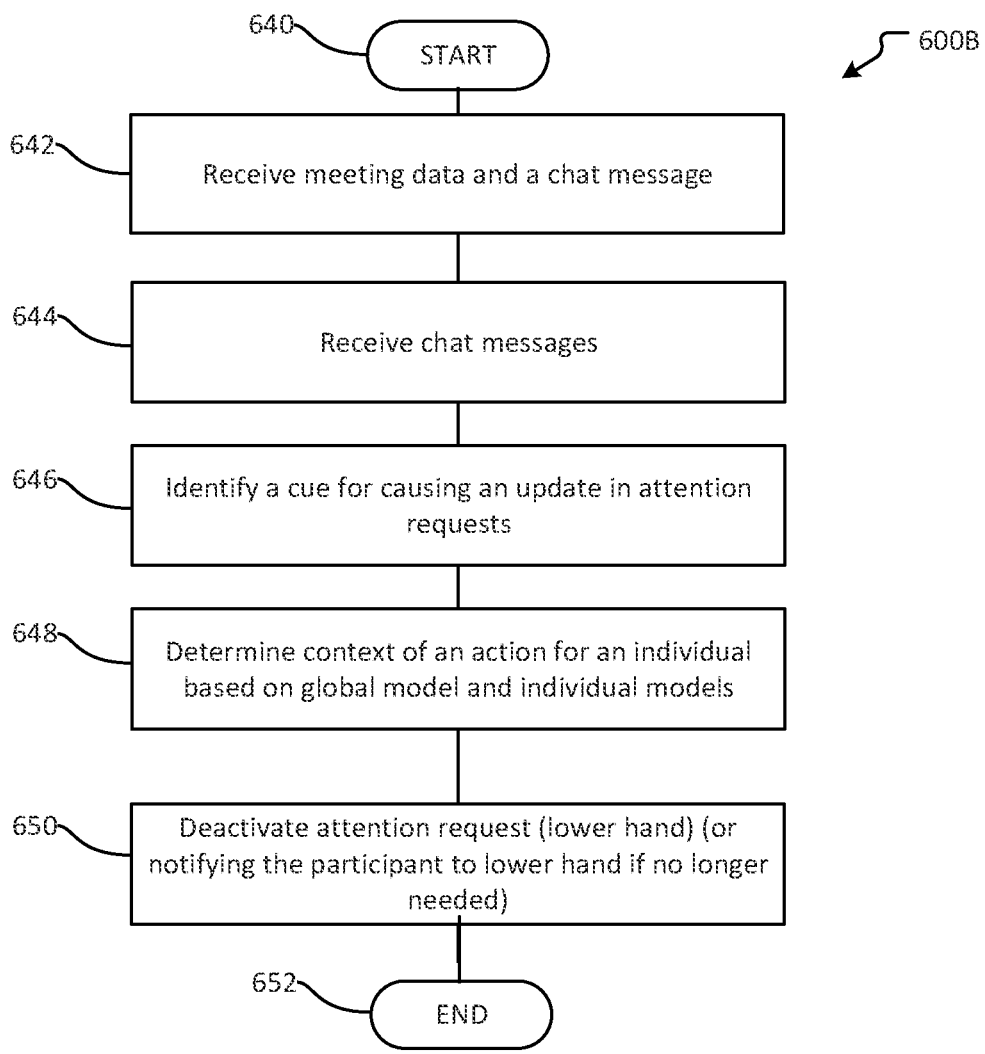
FIG. 6B illustrates an example of a method for automatically controlling participant indication requests in accordance with aspects of the present disclosure.

FIG. 6B is an example of a method for automatically controlling participant indication requests in accordance with aspects of the present disclosure. A general order of the operations for the method 600B is shown in FIG. 6B. Generally, the method 600B begins with start operation 640 and ends with end operation 652. The method 600B may include more or fewer steps or may arrange the order of the steps differently than those shown in FIG. 6B. The method 600B can be executed as a set of computer-executable instructions executed by a computer system and encoded or stored on a computer readable medium. Further, the method 600B can be performed by gates or circuits associated with a processor, an ASIC, an FPGA, a SOC or other hardware device. Hereinafter, the method 600B shall be explained with reference to the systems, components, devices, modules, software, data structures, data characteristic representations, signaling diagrams, methods, etc., described in conjunction with FIGS. 1, 2, 3, 4, 5, 6A, 7, and 8A-B.

Following start operation 640, the method 600B begins with receive operation 642, which receives meeting data a participant of a virtual meeting. In aspects, the meeting data may include video streaming of the participant participating in the virtual meeting, audio data from the participant, and/or background acoustic data from the participant, as examples. In aspects, the receive operation 642 receives the meeting data for the participant along with meeting data for all other participants of the virtual meeting in a synchronous manner for multiplexing and transmitting respective meeting data to respective client devices.

Receive operation 644 receives chat messages for the participant of the virtual meeting. In aspects, the virtual meeting application server provides a chat messaging feature to hosts and participants of the virtual meeting to exchange texts and images as they engage in the virtual meeting via video and audio. In some aspects, participants may use the chat messaging to send and receive comments and information that supplement the virtual meeting using video and audio data streams.

Identify operation 646 identifies a cue for which a context indicates a need for automatically updating participant indication requests. A cue is some indication in the meeting data (video/audio/background acoustic data, etc.). The cue has some meaning that implicates a context for automatically controlling participant indication requests. In aspects, the identify operation 646 identifies the cue based on a combination of a status of the participant indication request for the participant and a timing of the participant sending a chat message. For example, a cue as a cause for automatically disabling a participant indication request may include a combination of conditions. For example, the combination may include the participant having an active participant indication request and actively sending (or receiving) chat messages.

Additionally, or alternatively, the cue may include one or more of a particular noise or sound in background sounds (e.g., a telephone ringing, another person talking with the participant, and other audio data and acoustic signal data from the virtual meeting). The cue may further include textual conversations using messaging, speech utterances, closed caption data, mouse/pointer movements on the client device (e.g., the client device 102B (Participant)), eye gaze associated with the participant, and camera information associated with the participant. The cue may yet further include facial information associated with the participant, gesture information associated with the participant indicative or inferable about dropping the raised hands, and predefined information associated with a user preference to raise or lower hand. For example, having the cue where another person is talking with the participant as detected in the background sound may lower hand because the participant is not focused on participating in the virtual meeting despite the participant having requested the host's focus of attention by raising hand.

Determine operation 648 determines a context of an action for an individual based on a global participant indication model and an individual participant indication model. In aspects, the determine operation 648 uses the global participant indication model for determining a context that is in common with other participants of the virtual meeting. The determine operation 648 uses the individual participant indication model for determining a context that is specific to the participant. For example, the determine operation 648 may determine the cue including the combination of conditions where the participant has the active participant indication request and actively sending (or receiving) chat messages as the following: the participant is focusing on chat messaging, possibly asking a question and no longer interested in keeping the raised hand. In another example, the individual participant indication model may have been trained to keep the participant indication request active even when the frequent chat messaging is taking place.

Deactivate operation 650 automatically deactivates the participant indication request for the participant in response to the determined context where the participant actively communicates with other participants using chat messages. In aspects, the virtual meeting server interprets that the participant may no longer be interested a participant indication request when the participant has the hand raised but communicating over chat messaging. The deactivate operation 650 updates displaying the participant indication request (e.g., the hand) lowered on all the client devices used for the virtual meeting. Additionally or alternatively the deactivate operation 650 may transmit a notice to the participant. The notice may solicit the participant to lower the hand if the participant is no longer interested in participating or the raised hand is no longer necessary. The end operation 652 ends the method 600B.

As should be appreciated, operations 640-652 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
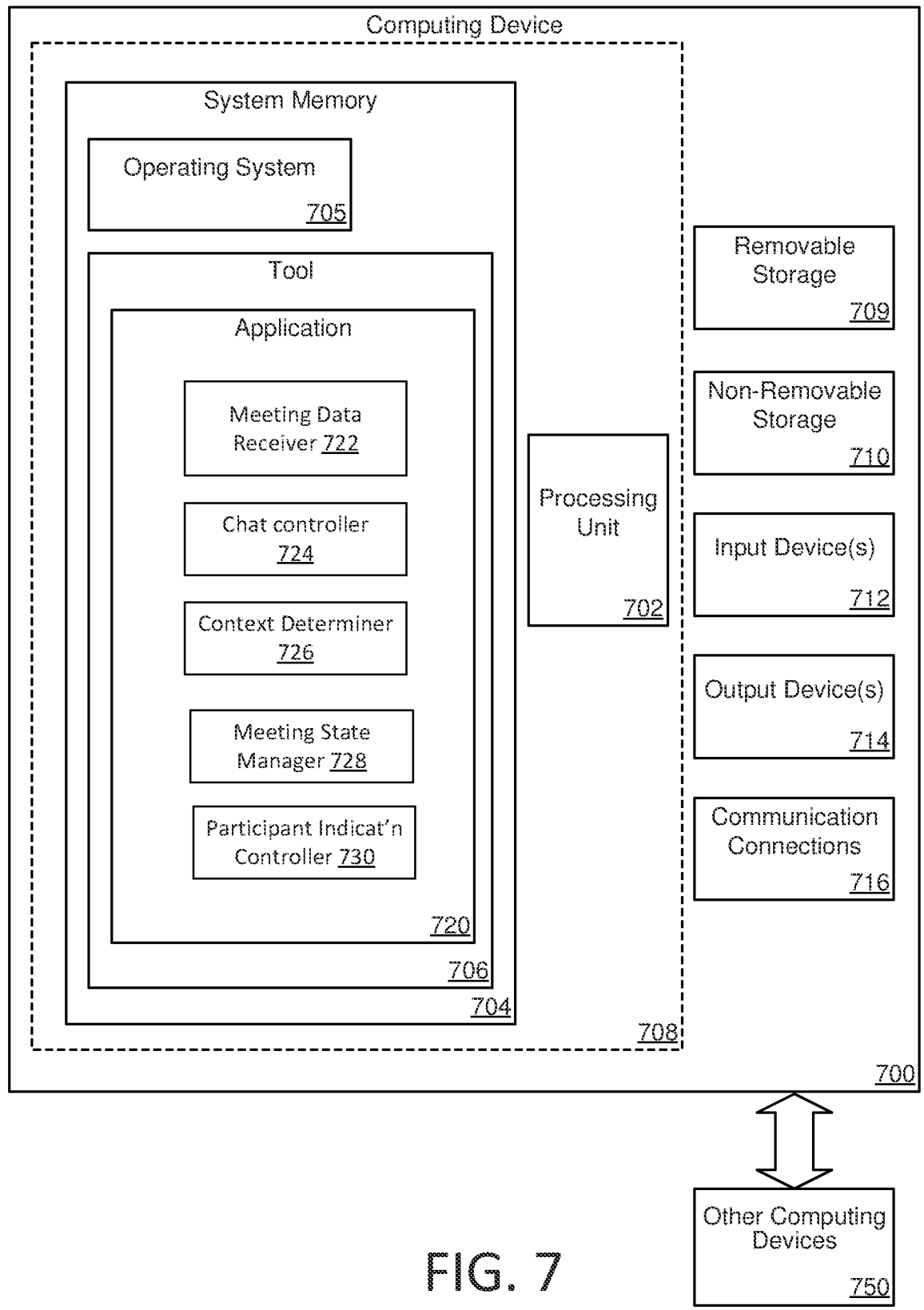
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes a meeting data receiver 722, a chat controller 724, a context determiner 726, a meeting state manager 728, and a participant indication controller 730, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
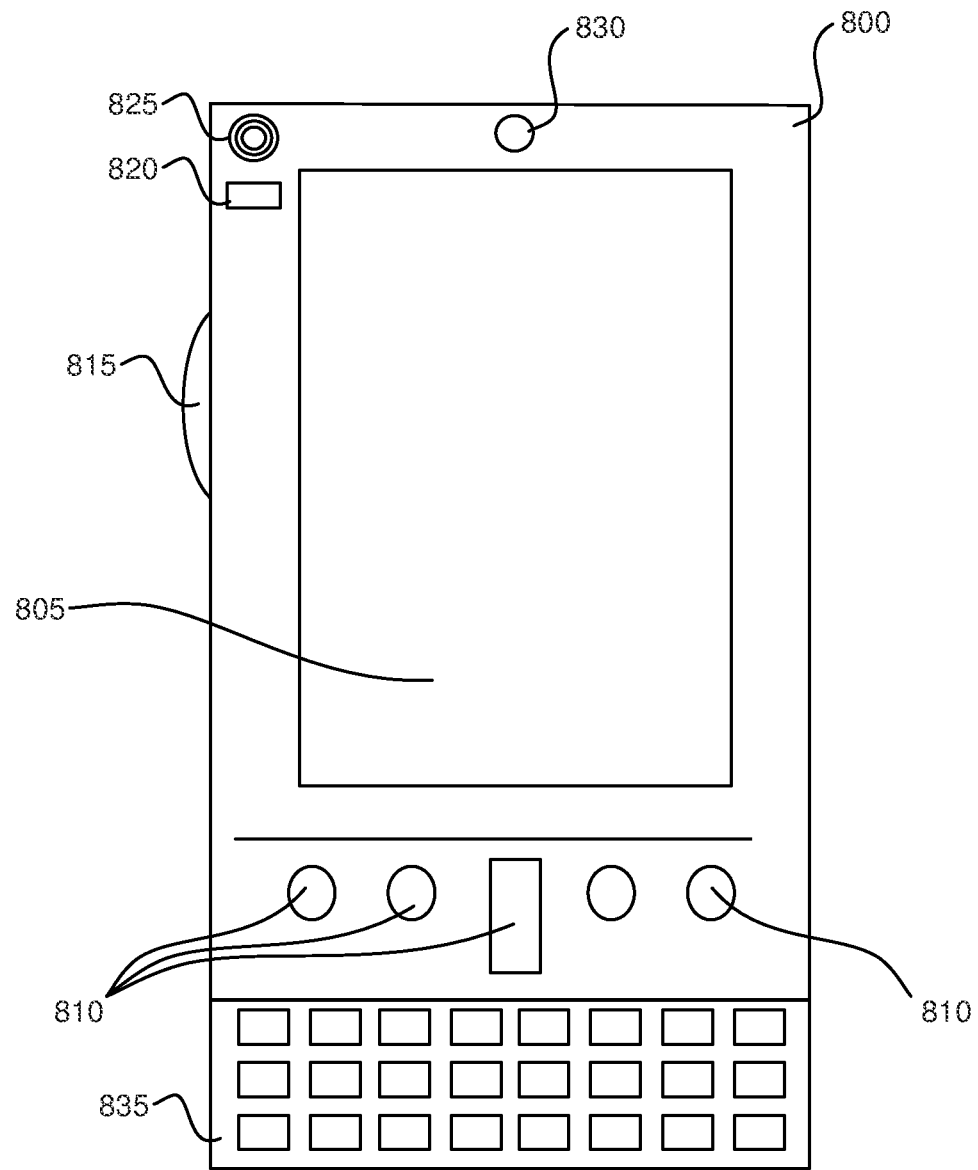
FIG. 8A is a simplified diagram of a mobile computing device with which aspects of the present disclosure may be practiced.
Figure 8B:
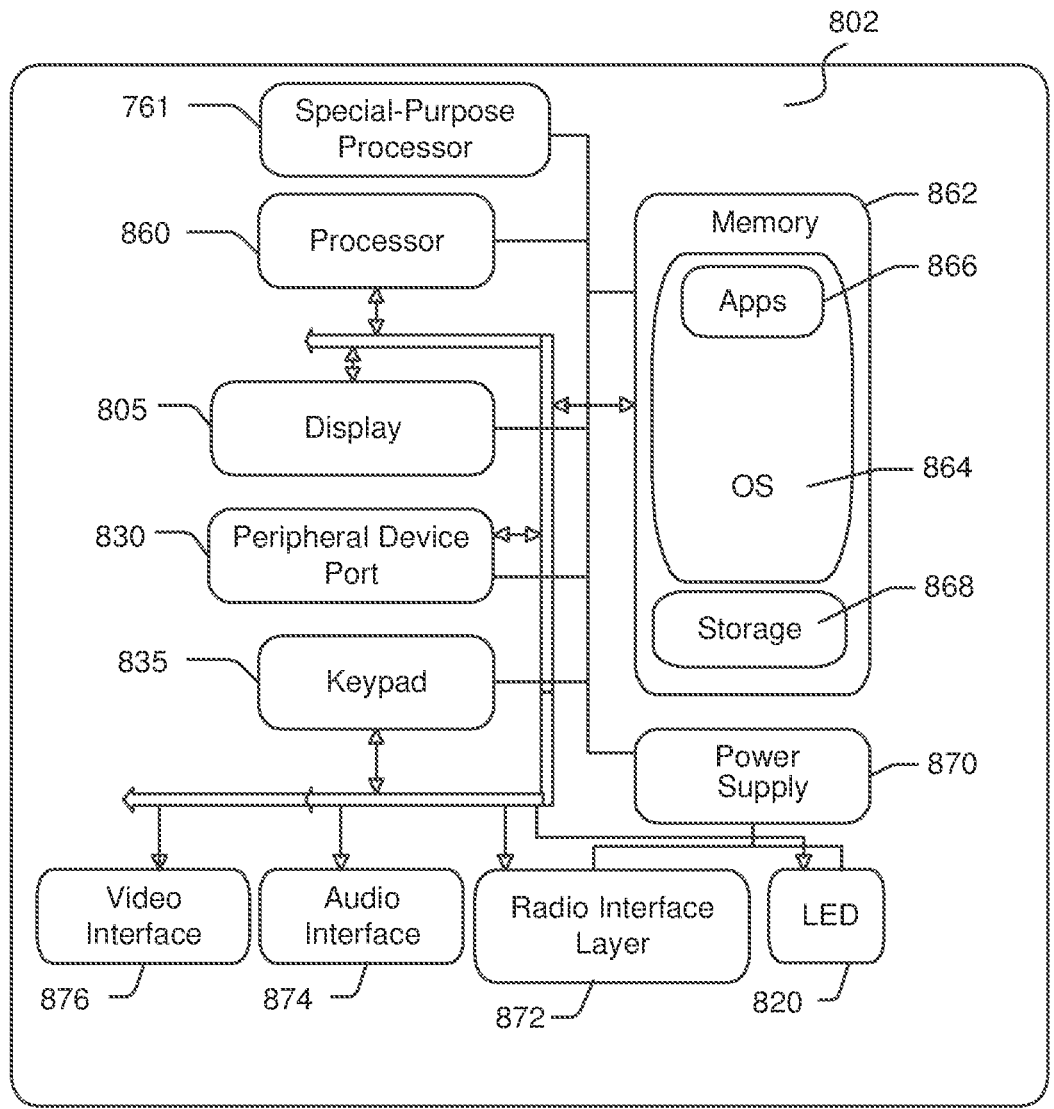
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., user of client device 102 in FIG. 1) may be a mobile computing device. With reference to FIG. 8A, one aspect of a mobile computing device 800 for implementing the aspects is illustrated. In a basic configuration, the mobile computing device 800 is a hand-held computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., an application server 110 and virtual meeting server 120 in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for automatically updating a participant indication request in a virtual meeting according to at least the examples provided in the sections below. The method comprises receiving an indication of a participant's interest to be a focus of the virtual meeting; after receiving the indication, causing display of a graphical indicator associated with the participant's interest; after causing display of the graphical indicator, receiving meeting data corresponding to the virtual meeting; determining, based on the meeting data, a meeting context using a participant indication model, wherein the participant indication model predicts the meeting context with one or more confidence levels based on one or more attributes of the virtual meeting; and automatically deactivating, based on the determined meeting context, a participant indication of the participant. The method further comprises automatically updating, based at least on the determined meeting context, the participant indication request of the participant of the virtual meeting, wherein the participant indication request includes lowering a hand; and causing, based on the updated participant indication request, display of the graphical indicator, wherein the graphical indicator corresponds to the lowered hand. The meeting data includes at least one of: one or more textual conversations, audio data, acoustic signal data, speech utterances, closed caption data, background sound, mouse/pointer movement data, eye gaze associated with the participant, facial information associated with the participant, gesture information associated with the participant, or predefined information associated with a user preference to raise or lower hand. The participant indication model is previously trained using prior meeting data, wherein the prior meeting data corresponds to one or more meeting data associated with one or more prior virtual meetings. The automatically deactivating the participant indication request corresponds to, based on a confidence level of an output from the participant indication model, at least one of: transmitting a notice to the participant, wherein the notice solicits the participant to lower the hand when no longer intending to participate, or causing display of the graphical indicator representing a lowered hand. The participant indication model includes a global participant indication model and an individual participant indication model, the method further comprising: determining, based at least on the global participant indication model, a common meeting context, wherein the common meeting context is applicable to a plurality of participants of the virtual meeting; and determining, based at least on the individual participant indication model, an individual meeting context for the participant. The method further comprises receiving a chat message sent from the participant; and determining, based at least on the received chat message and a status of the participant indication request by the participant, the meeting context, wherein the status of the participant indication request is active. The meeting state includes polling, and the method further comprises determining a meeting context using an participant indication model, wherein the meeting context corresponds to an end of the polling; and automatically deactivating, based on the determined meeting context, a participant indication request of a plurality of participants of the virtual meeting. The participant indication model includes a meeting-specific participant indication model and an organization-specific participant indication model, the method further comprises determining, based at least on the meeting-specific participant indication model, a common meeting context, wherein the common meeting context is applicable to a plurality of participants of a combination of the virtual meeting and previously held virtual meetings, wherein the plurality of participants include the participant; and determining, based at least on the organization-specific participant indication model, wherein the common meeting context is applicable to a plurality of participants from an organization, wherein the organization includes the participant.

Another aspect of the technology relates to a system for automatically updating a participant indication request in a virtual meeting. The system comprises: a processor; and a memory storing computer-executable instructions that when executed by the processor cause the system to: receive an indication of a participant's interest to be a focus of the virtual meeting; after receiving the indication, cause display of a graphical indicator associated with the participant's interest; after causing display of the graphical indicator, receive meeting data corresponding to the virtual meeting; determine, based on the meeting data, a meeting context using a participant indication model, wherein the participant indication model predicts the meeting context with one or more confidence levels based on one or more attributes of the virtual meeting; and automatically deactivate, based on the determined meeting context, a participant indication of the participant. The computer-executable instructions when executed further causes the system to: automatically update, based at least on the determined meeting context, the participant indication request of the participant of the virtual meeting. wherein the participant indication request includes lowering a hand; and cause, based on the updated participant indication request, display of the graphical indicator, wherein the graphical indicator corresponds to the lowered hand. The meeting data includes at least one of: one or more textual conversations, audio data, acoustic signal data, speech utterances, closed caption data, background sound, mouse/pointer movement data, eye gaze associated with the participant, facial information associated with the participant, gesture information associated with the participant, or predefined information associated with a user preference to raise or lower hand. The participant indication model is previously trained using prior meeting data, wherein the prior meeting data corresponds to one or more meeting data associated with one or more prior virtual meetings. The automatically deactivating the participant indication request corresponds to, based on a confidence level of an output from the participant indication model, at least one of: transmitting a notice to the participant, wherein the notice solicits the participant to lower the hand when no longer intending to participate, or causing display of the graphical indicator representing a lowered hand. The computer-executable instructions when executed further cause the system to: receive a chat message sent from the participant; and determine based on the received chat message and a status of the participant indication request by the participant, the meeting context, wherein the status of the participant indication request is active.

Another aspect of the technology relates to a computer-readable medium storing computer-executable instruction. A computer-readable recording medium storing computer-executable instructions, when executed by a processor, cause a computer system to: receive an indication of a participant's interest to be a focus of the virtual meeting; after receiving the indication, cause display of a graphical indicator associated with the participant's interest; after causing display of the graphical indicator, receive meeting data corresponding to the virtual meeting; determine, based on the meeting data, a meeting context using a participant indication model, wherein the participant indication model predicts the meeting context with one or more confidence levels based on one or more attributes of the virtual meeting; and automatically deactivate, based on the determined meeting context, a participant indication of the participant. The computer-executable instructions when executed further causes the system to: automatically update, based at least on the determined meeting context, the participant indication request of the participant of the virtual meeting. wherein the participant indication request includes lowering a hand; and cause, based on the updated participant indication request, display of the graphical indicator, wherein the graphical indicator corresponds to the lowered hand. The meeting data includes at least one of: one or more textual conversations, audio data, acoustic signal data, speech utterances, closed caption data, background sound, mouse/pointer movement data, eye gaze associated with the participant, facial information associated with the participant, gesture information associated with the participant, or predefined information associated with a user preference to raise or lower hand. The participant indication model is previously trained using prior meeting data, wherein the prior meeting data includes prior conversations associated with the participant in prior virtual meetings. The automatically deactivating the participant indication request corresponds to, based on a confidence level of an output from the participant indication model, at least one of: transmitting a notice to the participant, wherein the notice solicits the participant to lower the hand when no longer intending to participate, or causing display of the graphical indicator representing a lowered hand.

Any of the one or more above aspects in combination with any other of the one or more aspect. Any of the one or more aspects as described herein.

What is claimed is:

1. A computer-implemented method of automatically updating a participant indication request in a virtual meeting, the method comprising:
   receiving, from a participant, an indication of the participant's interest to be a focus of the virtual meeting;
   causing display of a graphical indicator associated with the participant's interest;
   after causing display of the graphical indicator, receiving meeting data corresponding to the virtual meeting;
   determining, based on the meeting data, a meeting context using a participant indication model, wherein the meeting context according to the participant indication model indicates the participant is no longer interested in having a focus of attention in the virtual meeting when the meeting data includes audio data indicating the participant ends talking; and
   automatically causing, based on the determined meeting context, an update to the display of the graphical indicator, wherein the update includes deactivating a graphical indication of the participant's interest.

2. The computer-implemented method of claim 1, the method further comprising:
   automatically updating, based at least on the determined meeting context, the participant indication request of the participant of the virtual meeting, wherein the participant indication request includes lowering a hand; and
   causing, based on the updated participant indication request, display of the graphical indicator, wherein the graphical indicator corresponds to the lowered hand.

3. The computer-implemented method of claim 1, wherein the meeting data includes at least one of:
   one or more textual conversations,
   the audio data,
   acoustic signal data,
   speech utterances,
   closed caption data,
   background sound,
   mouse/pointer movement data,
   eye gaze associated with the participant,
   facial information associated with the participant,
   gesture information associated with the participant, or
   predefined information associated with a user preference to raise or lower hand.

4. The computer-implemented method of claim 1, wherein the participant indication model is previously trained using prior meeting data, wherein the prior meeting data corresponds to one or more meeting data associated with one or more prior virtual meetings.

5. The computer-implemented method of claim 1, wherein the automatically deactivating the participant indication request corresponds to, based on a confidence level of an output from the participant indication model, at least one of:
- transmitting a notice to the participant, wherein the notice solicits the participant to lower the hand when no longer intending to participate, or
- causing display of the graphical indicator representing a lowered hand.

6. The computer-implemented method of claim 1, wherein the participant indication model includes a global participant indication model and an individual participant indication model, the method further comprising:
- determining, based at least on the global participant indication model, a common meeting context, wherein the common meeting context is applicable to a plurality of participants of the virtual meeting; and
- determining, based at least on the individual participant indication model, an individual meeting context for the participant.

7. The computer-implemented method of claim 1, the method further comprising:
- receiving a chat message sent from the participant; and
- determining, based at least on the received chat message and a status of the participant indication request by the participant, the meeting context, wherein the status of the participant indication request is active.

8. The computer-implemented method of claim 1, wherein the meeting context indicates polling, the method further comprising:
- determining a meeting context using the participant indication model, wherein the meeting context corresponds to an end of the polling; and
- automatically deactivating, based on the determined meeting context, a participant indication request of a plurality of participants of the virtual meeting.

9. The computer-implemented method of claim 1, wherein the participant indication model includes a meeting-specific participant indication model and an organization-specific participant indication model, the method further comprising:
- determining, based at least on the meeting-specific participant indication model, a common meeting context, wherein the common meeting context is applicable to a plurality of participants of a combination of the virtual meeting and previously held virtual meetings, wherein the plurality of participants includes the participant; and
- determining, based at least on the organization-specific participant indication model, the common meeting context, wherein the common meeting context is applicable to a plurality of participants from an organization, wherein the organization includes the participant.

10. A system for automatically updating a participant indication request in a virtual meeting, the system comprising:
- a processor; and
- a memory storing computer-executable instructions that when executed by the processor cause the system to:
  - receive, from a participant, an indication of the participant's interest to be a focus of the virtual meeting;
  - cause display of a graphical indicator associated with the participant's interest;
  - after causing display of the graphical indicator, receive meeting data corresponding to the virtual meeting;
  - determine, based on the meeting data, a meeting context using a participant indication model, wherein the meeting context according to the participant indication model indicates the participant is no longer interested in having a focus of attention in the virtual meeting when the meeting data includes audio data indicating the participant ends talking; and
  - automatically causing, based on the determined meeting context, an update to the display of the graphical indicator, wherein the update includes deactivating a graphical indication of the participant's interest.

11. The system of claim 10, the computer-executable instructions when executed further causing the system to:
- automatically update, based at least on the determined meeting context, the participant indication request of the participant of the virtual meeting, wherein the participant indication request includes lowering a hand; and
- cause, based on the updated participant indication request, display of the graphical indicator, wherein the graphical indicator corresponds to the lowered hand.

12. The system of claim 10, wherein the meeting data includes at least one of:
- one or more textual conversations,
- the audio data,
- acoustic signal data,
- speech utterances,
- closed caption data,
- background sound,
- mouse/pointer movement data,
- eye gaze associated with the participant,
- facial information associated with the participant,
- gesture information associated with the participant, or
- predefined information associated with a user preference to raise or lower hand.

13. The system of claim 10, wherein the participant indication model is previously trained using prior meeting data, wherein the prior meeting data corresponds to one or more meeting data associated with one or more prior virtual meetings.

14. The system of claim 10, wherein the automatically deactivating the participant indication request corresponds to, based on a confidence level of an output from the participant indication model, at least one of:
- transmitting a notice to the participant, wherein the notice solicits the participant to lower the hand when no longer intending to participate, or
- causing display of the graphical indicator representing a lowered hand.

15. The system of claim 10, the computer-executable instructions when executed further causing the system to:
- receive a chat message sent from the participant; and
- determine based on the received chat message and a status of the participant indication request by the participant, the meeting context, wherein the status of the participant indication request is active.

16. A computer-readable recording medium storing computer executable instructions that when executed by a processor cause a computer system to:
- receive, from a participant, an indication of the participant's interest to be a focus of a virtual meeting;
- cause display of a graphical indicator associated with the participant's interest;
- after causing display of the graphical indicator, receive meeting data corresponding to the virtual meeting;
- determine, based on the meeting data, a meeting context using a participant indication model, wherein the meeting context according to the participant indication model indicates the participant is no longer interested in having a focus of attention in the virtual meeting when the meeting data includes audio data indicating the participant ends talking; and automatically causing, based on the determined meeting context, an update to the display of the graphical indicator, wherein the update includes deactivating a graphical indication of the participant's interest.

17. The computer-readable recording medium of claim 16, the computer-executable instructions when executed further causing the computer system to:

automatically update, based at least on the determined meeting context, a participant indication request of the participant of the virtual meeting, wherein the participant indication request includes lowering a hand; and cause, based on the updated participant indication request, display of the graphical indicator, wherein the graphical indicator corresponds to the lowered hand.

18. The computer-readable recording medium of claim 16, wherein the meeting data includes at least one of:

one or more textual conversations,
the audio data,
acoustic signal data,
speech utterances,
closed caption data,
background sound,
mouse/pointer movement data,
eye gaze associated with the participant,
facial information associated with the participant,
gesture information associated with the participant, or
predefined information associated with a user preference to raise or lower hand.

19. The computer-readable recording medium of claim 16, wherein the participant indication model is previously trained using prior meeting data, wherein the prior meeting data includes prior conversations associated with the participant in prior virtual meetings.

20. The computer-readable recording medium of claim 16, wherein the automatically deactivating the participant indication request corresponds to, based on a confidence level of an output from the participant indication model, at least one of:

transmitting a notice to the participant, wherein the notice solicits the participant to lower the hand when no longer intending to participate, or causing display of the graphical indicator representing a lowered hand.

* * * * *